US011548201B2

(12) United States Patent
De Cuyper et al.

(10) Patent No.: US 11,548,201 B2
(45) Date of Patent: Jan. 10, 2023

(54) PRESSURE PACKAGING WITH IMPROVED DROP RESISTANCE AND IMPACT RESISTANCE

(71) Applicant: RESILUX N.V., Wetteren (BE)

(72) Inventors: Dirk De Cuyper, Destelbergen (BE); William Dierickx, Destelbergen (BE); Tom Anthierens, Bruges (BE)

(73) Assignee: RESILUX N.V., Wetteren (BE)

( * ) Notice: Subject to any disclaimer, the term of this patent is extended or adjusted under 35 U.S.C. 154(b) by 91 days.

(21) Appl. No.: 16/969,110

(22) PCT Filed: Feb. 12, 2019

(86) PCT No.: PCT/IB2019/051126
§ 371 (c)(1),
(2) Date: Aug. 11, 2020

(87) PCT Pub. No.: WO2019/155445
PCT Pub. Date: Aug. 15, 2019

(65) Prior Publication Data
US 2021/0031431 A1 Feb. 4, 2021

(30) Foreign Application Priority Data
Feb. 12, 2018 (BE) .................................. 2018/5084

(51) Int. Cl.
| | |
|---|---|
| B29C 44/12 | (2006.01) |
| B29C 49/06 | (2006.01) |
| B65D 1/02 | (2006.01) |
| B65D 81/38 | (2006.01) |
| B29D 22/00 | (2006.01) |
| B29B 11/14 | (2006.01) |
| B29K 67/00 | (2006.01) |
| B29L 31/00 | (2006.01) |

(52) U.S. Cl.
CPC ............ B29C 49/06 (2013.01); B65D 1/0215 (2013.01); *B29B 11/14* (2013.01); *B29C 2949/22* (2022.05); *B29C 2949/26* (2022.05); *B29C 2949/28* (2022.05); *B29K 2067/00* (2013.01); *B29L 2031/7158* (2013.01)

(58) Field of Classification Search
CPC ............ B29C 44/1242; B29C 44/1247; B29C 66/52211; B29C 44/1271; B29C 49/06; B65D 81/38; B65D 81/3846; B65D 1/0215; B29D 22/003; B29L 2031/7158
USPC ........................................................ 215/13.1
See application file for complete search history.

(56) References Cited

U.S. PATENT DOCUMENTS

| | | | | |
|---|---|---|---|---|
| 3,037,652 A | * | 6/1962 | Wallace | A47J 41/00 264/46.7 |
| 3,120,570 A | * | 2/1964 | Kennedy | B29C 66/12463 264/269 |
| 3,214,830 A | * | 11/1965 | Piker | B65D 81/3846 220/592.2 |
| 3,232,893 A | * | 2/1966 | Salgado | C08J 9/147 525/49 |
| 4,103,411 A | * | 8/1978 | Gottsegen | B29C 49/0031 264/150 |
| 4,974,551 A | * | 12/1990 | Nelson | F24H 1/18 220/592.2 |
| 5,287,987 A | | 2/1994 | Gaiser | |
| 6,764,622 B2 | * | 7/2004 | Moran | A47J 41/00 264/46.7 |
| 9,394,098 B2 | | 7/2016 | Kohls et al. | |
| 2012/0104663 A1 | * | 5/2012 | Ogata | B29C 45/14836 264/513 |
| 2015/0001256 A1 | | 1/2015 | Kohls et al. | |

FOREIGN PATENT DOCUMENTS

| | | |
|---|---|---|
| DE | 3843375 A1 | 6/1990 |
| DE | 19650357 A1 | 6/1998 |
| EP | 2791030 B1 | 5/2016 |
| FR | 2661156 A1 | 10/1991 |
| GB | 2214891 A | 9/1989 |
| WO | 2005082744 A1 | 9/2005 |

OTHER PUBLICATIONS

Rosato et al, Blow Molding Handbook, 1989, Oxford University Press, section Stretch Blow Mold, pp. 27 and 32-34. (Year: 1989).*
Search Report and Written Opinion from corresponding BE Application No. BE201805084, dated Oct. 2, 2018.
International Search Report and Written Opinion from PCT Application No. PCT/IB2019/051126, dated May 9, 2019.

* cited by examiner

*Primary Examiner* — Robert B Davis
(74) *Attorney, Agent, or Firm* — Workman Nydegger

(57) ABSTRACT

A multi-layered pressure packaging comprises a first container including a lockable neck portion followed by a body part and a bottom part, obtained from a non-foamed thermoplastic material by stretch blow molding, and a first layer at least enclosing the body part and/or bottom part of the first container. The first layer comprises foamed material, and the foamed material layer is foamed in place with an outer enclosure applied over and around the first container defining a free space in between, and foamable material introduced and foamed between the first container and the outer enclosure in the free space, obtaining the foamed material layer. A second layer is applied on the outer surface of the foamed layer for keeping the foamed layer and the first container together. Methods are provided for manufacturing a multi-layered pressure packaging according to an embodiment.

14 Claims, No Drawings

PRESSURE PACKAGING WITH IMPROVED DROP RESISTANCE AND IMPACT RESISTANCE

TECHNICAL FIELD

The invention is situated in the domain of pressure packaging. The present invention provides pressure packaging with improved properties, such as light weight, large stiffness and strength, improved drop resistance, large impact resistance and/or limited environmental impact. The invention is important for the packaging industry, especially spray cans and gas bottles.

BACKGROUND

Pressure packaging are generally known. A pressure packaging should offer resistance to internal pressure of the filling product enclosed in the packaging. With normal use, there may not be risk of bursting.

Examples of pressure packaging are soft drink bottles filled with carbonated drinks, spray cans or aerosols filled with a propellant such as propane or compressed nitrogen or air.

Existing pressure packaging generally comprise bulges and a spherical shaped bottom part, because they are the most pressure-resistant. Often, one has switched from glass to plastics to make packaging lighter. A processing technique that is appropriate for making round shapes from plastics, is a blow moulding process. Particularly a blow moulding process with a stretch phase of the plastic material is advantageous to obtain a plastic material that is thinner, light and strong. However, a skilled person will know that the orientation of the polymer chains of the plastic material in the stretch phase is not optimal in the shoulder and bottom parts of the stretch blow moulded packaging, for example a bottle.

Proposals to improving this consist of providing additional material thickness. A blowing process is however limited in the wall thickness that can be obtained. EP 2 791 030 suggests working with a double container to obtain additional strength. Providing additional wall thickness by applying an additional portion to the shoulder and/or bottom was also suggested, for example in U.S. Pat. No. 9,394,098. This usually does not result in an attractive look. However, the aesthetic aspect is important for the consumer experience.

Another suggestion, that has been used in gas bottle, consists of applying glass fibre windings around a plastic container. This has for example been described in U.S. Pat. No. 5,2870987. This construction makes recycling difficult. The gas bottle is also difficult to stack.

In spray cans, filling product mixed with a propellant can be replaced by a spray can construction wherein an additional inner container contains a supply of propellant and discharges it as needed to an outer container with the product to be dispensed. An example has been described in WO 2005/082744. This relieves pressure on the outer container, but sets increased requirements for the inner container to withstand pressure. Without additional measures, this type of container-in-container is limited to typically 8 bar, at most to a pressure of 20 bar.

GB 2214891 discloses a spray can comprising a stretch blow moulded inner container with hemispherical bottom, possibly from PET, and an outer body from a rigid material with flat, U-shaped bottom, formed by injection moulding a plastic such as PET. The outer body and the inner container are fixated by in situ foamed plastic material. The inner container that functions as a pressure vessel, has a thinner wall than the outer container. The thick outer wall leads to a significant weight increase.

FR 2661156 describes a method wherein the inner container is placed in a mould and a polyurethane mixture is foamed in the space between the container and the mould. After removal of the mould, a container with single-piece foam body is obtained, with a flat bottom. The container is a glass bottle or metal container, with a flat bottom. The thus obtained packaging is a packaging for perfume. The foam body is used to increase the freedom of design. The disclosure is not directed to improving plastic pressure packaging.

DE 3843375 describes a method wherein an inner container is placed in a mould, the mould wall is covered with a foil bag and isolation foam is inserted in a space between the foil bag and the inner container. Both the inner container and the foam layer have a curved bottom. The packaging is used for household water storage. The disclosure is not directed to improving plastic pressure packaging.

DE 19650357 described a method for an isolation container comprising a two-piece outer enclosure obtained by foaming a foam layer of plastic. The disclosure is not directed to improving plastic pressure packaging.

Consequently, there is a need for further alternatives and improvements.

The present invention aims to solve one or more of the above-mentioned problems.

SUMMARY OF THE INVENTION

The invention relates to a solution for the problem of providing pressure packaging with an improved drop resistance and an improved impact resistance. Moreover, the solutions proposed are light and have a larger stiffness and strength. Additionally, a reduced environmental impact can be obtained.

The present invention thereto provides a multi-layered pressure packaging with an inner container that is obtained by stretch blow moulding, at least partially enclosed by a so-called "pour-in-place" or "form-in-place" foam layer.

More specifically, the present invention provides a multi-layered pressure packaging comprising a first container comprising a lockable neck portion followed by a body part and a bottom part, obtained from a non-foamed thermoplastic material by stretch blow moulding of at least the body part, and a first layer at least enclosing the body part and/or bottom part of the first container, wherein the first layer comprises foamed material; the foamed material layer is foamed in place using an outer enclosure applied over and around the first container therebetween defining a free space, and foamable material was inserted in said free space between the first container and the outer enclosure and foamed thereby obtaining said foamed material layer, characterised in that a, preferably removable, second layer is applied on the outer surface of the foamed layer for holding the foamed layer and the first container together.

A pressure packaging according to an embodiment of the invention has the advantage that it consists of a strong, thin and light inner layer with on it a layer with little weight that provides the first container with an improved resistance to damage and/or breakage from falling.

In a second aspect, the invention provides a method for manufacturing a multi-layered pressure packaging according to an embodiment of the invention, comprising the steps:

manufacturing a preform from a non-foamed thermoplastic material, stretch blow moulding the preform to form a first container comprising a lockable neck portion followed by a body part and a bottom part, placing the first container in a mould with 0.2-10 cm of interspace between the inner wall of the mould and the outer wall of the first container for introduction of a foamable material, inserting and foaming the foamable material, removing the mould, applying a, preferably removable, second layer on the outer surface of the foamed layer for holding the foamed layer and the first container together, resulting in the multi-layered pressure packaging.

This method has the advantage of providing a stretch blow moulded container with additional reinforcement from a light and possibly slightly compressible material.

In a third aspect, the invention provides a method for manufacturing a multi-layered pressure packaging according to an embodiment of the invention, comprising the steps:

stretch blow moulding a first lockable container comprising a lockable neck portion followed by a body part and a bottom part, out of a thermoplastic material without use of a foaming agent, foaming at least two container-forming parts out of a foamable material, applying the two foamed container-forming parts around the first container, thereby forming a first outer layer around at least the body part and/or the bottom part of the first container, holding said first and second container together by means of the application of a, preferably removable, second layer on the outer surface of the foamed layer.

This method is advantageous because the protective layer can first be foamed in a desired shape, preferably form-fitting to the first container, and can subsequently be brought together with the first container.

In a fourth aspect, the invention provides a method for manufacturing a multi-layered pressure packaging according to an embodiment of the invention, comprising the steps:

stretch blow moulding a first lockable container comprising a lockable neck portion followed by a body part and a bottom part, out of a thermoplastic material without use of a foaming agent, stretch blow moulding a second lockable container, out of a thermoplastic material without use of a foaming agent, appropriate for enclosing the first container and forming an interspace between the containers, telescopically inserting the first container into the second container, thereby forming an interspace of 0.2-10 cm between the outer wall of the first container and the inner wall of the second container, applying a foamable material in the interspace, foaming the material, thereby filling up the interspace between the first and second container.

This method is advantageous because a sandwich structure is made consisting of two layers of thermoplastic material with a foam layer in between. The thermoplastic material layers can function as a mould for the application of a foamable material.

In a further aspect, the invention provides a method for manufacturing a multi-layered pressure packaging with a sandwich structure according to an embodiment of the invention, comprising the steps:

stretch blow moulding a first lockable container comprising a lockable neck portion followed by a body part and a bottom part, out of a thermoplastic material without use of a foaming agent, stretch blow moulding a second lockable container, out of a thermoplastic material without use of a foaming agent, appropriate for enclosing the first container and forming an interspace between the containers, removing the bottom part of said first and second containers, injection-moulding a separate bottom piece, preferably fibre-reinforced, combining the first and second container with the bottom piece for forming an interspace of 0.2-10 cm between the outer wall of the first container and the inner wall of the second container, applying a foamable material in the interspace, foaming the material in the interspace, thereby forming the multi-layered pressure packaging with a sandwich structure.

In a last aspect, the invention provides a product obtained with a method according to the invention, characterized in that the length of the first and second container are substantially the same and said body part is enclosed by a hard foam.

Further preferred embodiments are elaborated in the dependent claims.

DETAILED DESCRIPTION OF THE INVENTION

Unless otherwise specified, all terms used in the description of the invention, including technical and scientific terms, shall have the meaning as they are generally understood by the person skilled in the technical field the present invention relates to. Furthermore, definitions of the terms have been included for a better understanding of the description of the present invention.

As used here, the following terms shall have the following meaning: "A", "an" and "the", as used here, refer to both the singular and the plural form unless clearly understood differently in the context. For example, "a compartment" refers to one or more than one compartment.

"Approximately" as used here, that refers to a measurable value such as parameter, a quantity, an amount, a period and such, is meant to include variations of +/−20% or less, preferably +/−10% or less, more preferably +/−5% or less, still more preferably +/−1% or less, and even still more preferably +/−0.1% or less of the cited value, as far as such variations are appropriate for realizing the invention that is described. It will however be clear that the value to which the term "approximately" relates, will also be described specifically. The terms "include", "including" and "included", as used here, are synonym with "comprise", "comprising" and "comprises" and are inclusive of open terms that indicate the presence of what follows e.g. a component, and that do not exclude the presence of additional, non-said components, characteristics, elements, members, steps, that are well-known from or described in the state of the art.

The citation of numeric intervals by means of end points includes all integers and fractions included within that interval, including these end points.

The term "w/w %", as used here, refers to a weight percentage wherein the ratio of the weight of an ingredient to the total weight of a bottle with closing means, is expressed as a percentage.

In a first aspect, the invention provides a multi-layered pressure packaging comprising a first container comprising a lockable neck portion followed by a body part and a bottom part. Preferably, the first container is a single part.

The first container can also be obtained by providing a bottomless container, with a bottom part attached to the body part.

The container is made out of a non-foamed thermoplastic material by means of stretch blow moulding. Thermoplastic materials that are appropriate for processing by stretch blow moulding are for example a polyester, such as polyethylene terephthalate, abbreviated as PET, or polyethylene furanoate, abbreviated as PEF. The first container is preferably a PET container; more preferably an integral PET container. This choice of material is advantageous for mass production. Recycling techniques for polyester containers obtained by stretch blow moulding are well-known to the skilled person.

In an alternative embodiment, the container is made of high-density polyethylene (HDPE) or polypropylene (PP). These materials have a very good chemical resistance. The limited pressure resistance of HDPE and PP can be compensated by the container construction, in particular by the layer of foamed material.

The pressure packaging also comprises a layer of foamed material. This foam layer encloses at least the body part of the container. Preferably, both the body part and the bottom part of the first container are enclosed by the layer of foamed material.

The foamed material is preferably a foamed polyester, foamed polyurea, a foamed polyepoxy, a foamed acrylate, a foamed polyurethane, a foamed polyvinyl chloride, silicone foam, syntactic foam, cellulose acetate foam, polyester foam or polystyrene. More preferably, the foam layer is a foamed polyester or foamed polyurethane. Most preferably, the foam layer is a foamed polyester. The choice of a foamed polyester is advantageous for recycling as only one type of material is used. This foamed polyester can be made from recycled PET. This upcycling is a high-quality application for a waste stream.

In the preparation of polyurethane foams, different components are used. A necessary component is a compound with free isocyanate (—NCO) radicals. This component can be a polyisocyanate, mostly a di-isocyanate, or a reaction product thereof, comprising free —NCO radicals. Said reaction product can also be called an adduct or a prepolymer. They are usually based on a polyol. Working with polyisocyanates requires special care and safety measures. Preferably, the polyisocyanates are first converted to prepolymers and the reaction is completed in a subsequent step.

A necessary second component supplies active hydrogen atoms, such as delivered by free hydroxyl groups from a polyol or from a hydroxyl group comprising polyester. The free hydroxyl groups are reactive. Alternative suppliers for the free hydrogen groups are compounds with reactive amine or carboxyl (—COOH) groups.

When free hydroxyl or carboxyl groups are reacted with free isocyanate radical, CO2 gas is formed in situ. The reaction thus delivers the foam-forming gas. These types of foam are known as carbon dioxide blown foams. The addition of a small amount of water is advantageous to react with the free —NCO groups and to form CO2 in situ again. Urea can be formed as intermediates. These react again with the free —NCO groups and form urethanes or provide crosslinking of the polymers formed in the reaction.

In the formulations for obtaining a foam, excipients can be present: catalysts, foaming agents, blowing agents, surfactants.

Diisocyanates suitable for use in the invention are aryl diisocyanates and aryl diisocyanates and alkyl diisocyanates. A suitable diisocyanate is toluene diisocyanate, known under the abbreviation TDI.

Other diisocyanates are 3,3'-bitoluene 4,4'-diisocyanate (TODI); diphenylmethane 4,4'-diisocyanate (MDI); polymethylene polyphenylisocyanate (PAPI); diphenyl-4,6,4'-triisocyanate; 1,6 hexamethylene diisocyanate; p-dixylyl methane-4,4'-diisocyanate; di-p-isocyanylcyclohexyl) methane; tri-(p-isocyanylphenyl)methane.

Commercially available polyhydroxy compounds are for example glycerol, sorbitol, trimethylolpropane, ethylene diamine, polyether polyols.

Catalysts that can be used are N-containing catalysts or metal catalysts. Examples of N-containing catalysts are N-methyl morpholine, N-ethyl morpholine, triethylene diamine, diethyl ethanol amine, dimethyl ethanol amine, triethylamine, and N,N,N',N'-tetramethyl-1,3-butane diamine. Examples of metal catalysts are tin chloride, tin octoate, iron acetyl acetonate, tri-n-butyltin acetonate, bis (2-ethylhexyl)tin oxide, di-n-butyl-tin octoate, bis(2-ethylhexyl)tin oxide, di-n-butyltin diacetate, di-n-butyltin dilaurate, dimethyltin dichloride. Combinations are also possible, for example trimethyl amine with di-n-butyltin diacetate.

Examples of surfactants are organo-silicon liquids.

The components are preferably formulated into a "foam-in-place" formulation, wherein the flow characteristics and cure time are adapted to the volume to be taken. "Foam-in-place" formulations are commercially available.

The foam layer is preferably slightly compressible. The foam layer preferably has a hardness of at least 70 Shore A, more preferably at least 80 Shore A, most preferably about 90 Shore A.

The foam layer can have an open or closed cell structure. The cell structure of the foam layer in the pressure packaging preferably has open cells. This structure is advantageous because the enclosure of air or gas bells in the cell structure offers an improved buoyancy. It is light-weighted.

The material can be foamed by means of a foaming agent, in situ generated or added.

The foam layer is applied by means of a removable or non-removable mould. If the mould is removed after forming the foam layer, then this results in a container with foam layer.

The pressure packaging preferably has a sandwich structure with the foam layer as middle layer. Preferably, the outer layer is also made of a non-foamed thermoplastic material by stretch blow moulding. Preferably, a polyester is also used for this, more preferably PET.

The foamed material layer distinguishes itself by being foamed in place by means of an outer enclosure that has been applied over and around the first container, defining a free space in between, and because a foamable material has been inserted and foamed between the first container and the outer enclosure in said free space, thereby obtaining said foamed material layer. This is a so-called "pour-in-place", "form-in-place" or "foam-in-place" construction. This construction is advantageous because well-fitting material layers are formed.

A pressure packaging according to an embodiment of the invention has the advantage of consisting of a strong and light inner layer with on it, a layer with limited weight offering to the first container an improved resistance to damage and/or breakage by falling. The foam layer can provide a cushion effect.

As an alternative, an adhesion layer can be applied between the foam layer and the plastic container for attachment of the foam layer to the plastic surface of the pressure vessel.

In an alternative embodiment, the foamed layer is non-adhesive to the non-foamed polyester material of the first container.

Furthermore a, preferably removable, layer is applied to the outer surface of the foamed layer for keeping the foamed layer and the first container together. This embodiment is especially advantageous for combination with a construction wherein the foam layer does not adhere to the first container. Upon removal, the inner container and foam layer can thus be separated. This facilitates recycling of the different materials.

In a preferred embodiment of the multi-layered pressure packaging, the removable layer is a shrink or stretch foil. The use of a stretch foil is advantageous because the foil wraps around the packaging and the pressure towards the inside, keeps the materials together. In a preferred embodiment, use is made of a self-adhesive stretch foil. A stretch foil can easily be separated from the other materials.

In a preferred embodiment of the multi-layered pressure packaging, the removable layer is a tensioning strap or tension belt. These means can advantageously be used to keep the foam layer and the inner container together. A tensioning strap can be re-used, even for a packaging with another diameter. Preferably, a polyester is also used for these enclosing means; most preferably, the same polyester is chosen as the one that has been selected for the first container.

In an alternative embodiment, use can be made of a film with tear tape configured for being torn through at least a part of the film. This facilitates the removal of the film.

In a preferred embodiment of the multi-layered pressure packaging, the first container is inserted in a second container, thereby forming an interspace. This construction can advantageously be used as a non-removable mould. The second container is preferably also obtained from a thermoplastic material by means of stretch blow moulding. In an alternative embodiment, use can be made of an extruded tubular form. After introducing a foamable material into the interspace and foaming, a sandwich structure is obtained. No separate, removable mould is required.

Preferably, the second container is an integral part. The integral part comprises a lockable neck, followed by a shoulder part, followed by a body part and a bottom part.

In an alternative embodiment, the second container has several parts. The multi-piece second container can be obtained by attaching a separate bottom piece to a container without a bottom part. The multi-piece second container is preferably obtained by stretch blow moulding a bottle, removing the bottom part, injection moulding a separate bottom piece, and replacing the cut-off bottom part by the injection moulded bottom piece.

The multi-piece second container is preferably a bottle whereby at least the body part was obtained from a thermoplastic material by stretch blow moulding; and the bottom part is preferably an injection moulded bottom part. An injection moulded bottom part is a separate bottom piece that has been obtained by injection moulding, without blow moulding. This construction is light and strong. The use of an injection moulded bottom offers a larger freedom of design. A design of the bottom piece wherein a semi-spherical base is used with raised vertical edges, is advantageous. This design can be included in a cylindrical wall, to provide a standing foot, that still has a pressure-resistant semi-spherical design.

The injection moulded bottom part is preferably attached to the body part obtained by stretch blow moulding, by means of laser welding. This is an attachment method without addition of material, as is the case with gluing. The injection moulded bottom part preferably has a design offering a standing plane to the pressure packaging. The use of an attachment is avoided.

A pressure packaging according to an embodiment of the invention can be used in a variety of domains, from gas tubes to industrial applications. The latter refers to containers with a content of at least 10 litres.

The multi-layered pressure packaging according to an embodiment of the invention preferably has a content of 50 ml to 30 litres, more preferably 100 ml to 25 litres, still more preferably 250 ml to 20 litres, most preferably 300 ml to 15 litres.

The multi-layered pressure packaging according to an embodiment of the invention preferably has a burst pressure of 20-500 bar, more preferably 25-100 bar, still more preferably 30-60 bar, most preferably 35-55 bar.

The term "burst pressure" as used herein, refers to the internal pressure that the packaging can resist. This is a measure for the mechanical strength limit of the packaging.

The invention also provides a method for manufacturing a pressure packaging according to an embodiment of the invention.

In a second aspect, the invention provides a method for manufacturing a multi-layered pressure packaging according to an embodiment of the invention, comprising the steps:
  manufacturing a preform from a non-foamed thermoplastic material,
  stretch blow moulding the preform to form a first container comprising a lockable neck portion followed by a body part and a bottom part,
  placing the first container in a mould with 0.2-10 cm of interspace between the inner wall of the mould and the outer wall of the first container for introduction of a foamable material,
  inserting and foaming the foamable material,
  removing the mould,
  applying a, preferably removable, second layer on the outer surface of the foamed layer for holding the foamed layer and the first container together,
  resulting in the multi-layered pressure packaging.

The processing of the foamable material can take place as follows: dosing different raw materials for forming a foamable composition; mixing at low or high pressure; foaming.

Dosing pumps can be used to bring the liquid raw materials to a mixing chamber in exact proportions. The raw materials can either be dosed separately or can be mixed in advance in two main flows: for example, one for polyol plus additives and a second one for isocyanate plus additives.

Low-pressure systems mix through a stirring mechanism. High-pressure systems can inject raw materials at high speed into a mixing chamber, as a result of which mixing takes place through the transfer of the kinetic energy.

After the polyol and isocyanate, possibly with a blowing agent, have been mixed, foaming takes place. The foam can be brought into the desired shape in various ways. The mixture of the raw materials can be introduced in an interspace in an evenly distributed way. Additives can be used to influence curing. Delaying the cure time is advantageous because the liquid mixture thus has the time to flow into the interspace and fill cavities.

Optionally use can be made of release means to release the shaped foam cushion from the mould.

This method has the advantage to provide a stretch blow moulded container with extra reinforcement made out of a light and possibly compressible material. Use is made of a mould which is removed after formation of the foam layer.

The foam layer can form the outer wall of the pressure packaging. In an alternative embodiment, the foam layer can be covered. An advantageous cover is the application of a printable film. Information can be printed onto it, for example a user instruction or label.

To increase the stackability of the pressure packaging, a foamed layer with angular structures and bearing surfaces can be chosen.

In a third aspect, the invention provides a method for manufacturing a multi-layered pressure packaging according to an embodiment of the invention, comprising the steps:
stretch blow moulding a first lockable container comprising a lockable neck portion followed by a body part and a bottom part, out of a thermoplastic material without use of a foaming agent,
foaming at least two container-forming parts out of a foamable material,
applying the two foamed container-forming parts around the first container, thereby forming a first outer layer around at least the body part and/or the bottom part of the first container, holding said first and second container together by means of the application of a, preferably removable, second layer on the outer surface of the foamed layer.

This method is advantageous because the protective layer can first be foamed into a desired shape, preferably form-fitting with the first container, and can be brought together with the first container afterwards.

In a further aspect, the invention provides a method for manufacturing a multi-layered pressure packaging according to an embodiment of the invention, comprising the steps:
stretch blow moulding a first lockable container comprising a lockable neck portion followed by a body part and a bottom part, out of a thermoplastic material without use of a foaming agent,
stretch blow moulding a second lockable container, out of a thermoplastic material without use of a foaming agent, appropriate for enclosing the first container and forming an interspace between the containers,
telescopically inserting the first container into the second container, thereby forming an interspace of 0.2-10 cm between the outer wall of the first container and the inner wall of the second container,
applying a foamable material in the interspace,
foaming the material, thereby filling up the interspace between the first and second container.

Preferably, the wall thickness of the body of said second lockable container is smaller than or equal to the wall thickness of the body of said first lockable container.

More preferably, the method comprises the steps:
removing the bottom part of said second lockable container,
replacing the bottom part by an injection moulded bottom piece, obtained without blow moulding, and configured for providing a standing foot for the multi-layered pressure packaging.

This method is advantageous because a sandwich structure is made consisting of two layers of thermoplastic material with a foam layer in between. The thermoplastic material layers can function as a mould for applying a foamable material. This "foam-in-place" production method is very advantageous. The foaming can be realized in the absence of special and expensive moulds. Since no mould needs to be removed after foaming, there is no need for the use of a multi-piece mould or a sliding mould.

In a preferred embodiment of a method according to the invention, a polymer layer is placed on the inside of the first container; the polymer layer is different from the thermoplastic material selected for the first container and is characterized by an improved chemical resistance to the packaging content compared to said thermoplastic material. In a preferred embodiment, polyethylene or polypropylene is chosen for the layer with improved chemical resistance. The application of a layer on the inside of the container with improved resistance to the filing material, offers more flexibility as to the choice of material for the stretch blow moulded container.

In a last aspect, the invention provides a method for manufacturing a multi-layered pressure packaging with a sandwich structure according to an embodiment of the invention, comprising the steps:
stretch blow moulding a first lockable container comprising a lockable neck portion followed by a body part and a bottom part, out of a thermoplastic material without use of a foaming agent,
stretch blow moulding a second lockable container, out of a thermoplastic material without use of a foaming agent, appropriate for enclosing the first container and forming an interspace between the containers,
removing the bottom part of said first and second containers,
injection-moulding a separate bottom piece, preferably fibre-reinforced,
combining the first and second container with the bottom piece for forming an interspace of 0.2-10 cm between the outer wall of the first container and the inner wall of the second container,
applying a foamable material in the interspace,
foaming the material in the interspace, thereby forming the multi-layered pressure packaging with sandwich structure.

A product obtained with a method according to the invention is preferably characterized in that the length of the first and second container are essentially the same and said body part is enclosed by a hard foam. Preferably, a valve is included in the separate bottom piece for bringing filling material under pressure. A valve that is appropriate for use in the invention is a Nicholson plug. The agent used for pressurizing filling material is preferably compressed air or another inert gas. Preferably, a non-flammable gas is used. If desired, pressurizing agent and filing material can be separated from each other by means of a piston. In an alternative embodiment, an inner container with pressure control valve can be used. This functions as a storage space for the pressurizing agent and can be delivered by means of the pressure control valve to a chamber with filling material for maintaining a constant delivery pressure.

The invention is further illustrated by means of examples. These examples are non-limiting.

EXAMPLES

Experiment 1

A 1 L PET bottle with a wall thickness of 0.45 mm was placed in a cut-off 2 L PET bottle with a wall thickness of 0.25 mm. Between both bottles, there was a free space of 5 mm, between which an epoxy foam was applied. The foam was foamed to 3× the initial liquid volume. The resulting bottle with sandwich structure had a minimal expansion of 2 mm at 25 bar.

Experiment 2

An integral 1 L PET bottle with a wall thickness of 0.45 mm, provided with a dosing valve, was placed in a two-piece 2 L PET bottle, with a wall thickness of 0.25 mm. The two-piece PET bottle was obtained by stretch blow moulding a 2 L PET bottle, cutting off the bottom part, replacing the bottom part obtained by stretch blow moulding by a bottom piece obtained by injection moulding, without a blowing step. Between both bottles, there was a free space of 5 mm, between which a polyester foam composition was applied. The composition was foamed to 3× the initial liquid volume. For the injection moulded piece, a shape was chosen that provides the pressure packaging with a standing foot. The resulting pressure packaging with sandwich structure had a minimal expansion of 2 mm at 25 bar.

The invention claimed is:

1. A multi-layered pressure packaging comprising a first container comprising a lockable neck portion followed by a body part and a bottom part, obtained from a non-foamed thermoplastic material by stretch blow molding of at least the body part, and a first layer at least enclosing the body part and/or bottom part of the first container,
   wherein the first layer comprises a foamed material layer;
   wherein the foamed material layer is foamed in place using an outer enclosure applied over and around the first container therebetween defining a free space, and foamable material was inserted in said free space between the first container and the outer enclosure and foamed thereby obtaining said foamed material layer,
   wherein a removable, second layer is applied on the outer surface of the foamed material layer for holding the foamed material layer and the first container together, and
   wherein the removable second layer is a stretch foil or a tensioning strap.

2. The multi-layered pressure packaging according to claim 1, wherein the thermoplastic material is a polyester, high-density polyethylene or polypropylene.

3. The multi-layered pressure packaging according to claim 1, wherein said foamable material is a polyester.

4. The multi-layered pressure packaging according to claim 1, wherein said outer enclosure is a second container,
   wherein at least the body part was obtained from a thermoplastic material by stretch blow molding; and
   wherein the bottom part is an injection molded bottom part.

5. The multi-layered pressure packaging according to claim 1, with a content of 50 ml to 30 liters.

6. A multi-layered pressure packaging comprising a first container comprising a lockable neck portion followed by a body part and a bottom part, obtained from a non-foamed thermoplastic material by stretch blow molding of at least the body part, and a first layer at least enclosing the body part and/or bottom part of the first container,
   wherein the first layer comprises foamed a material layer;
   wherein the foamed material layer is foamed in place using an outer enclosure applied over and around the first container therebetween defining a free space, and foamable material was inserted in said free space between the first container and the outer enclosure and foamed thereby obtaining said foamed material layer,
   wherein a removable, second layer is applied on the outer surface of the foamed material layer for holding the foamed material layer and the first container together, and
   wherein the pressure packaging is resistant to a burst pressure of 20-150 bar.

7. A method for manufacturing a multi-layered pressure packaging that comprises a first container comprising a lockable neck portion followed by a body part and a bottom part, obtained from a non-foamed thermoplastic material by stretch blow molding of at least the body part, and a first layer at least enclosing the body part and/or bottom part of the first container,
   wherein the first layer comprises a foamed material layer;
   wherein the foamed material layer is foamed in place using an outer enclosure applied over and around the first container therebetween defining a free space, and foamable material was inserted in said free space between the first container and the outer enclosure and foamed thereby obtaining said foamed material layer, and
   wherein a removable, second layer is applied on the outer surface of the foamed material layer for holding the foamed material layer and the first container together,
   the method comprising the steps:
   manufacturing a preform from a non-foamed thermoplastic material,
   stretch blow molding the preform to form a first container comprising a lockable neck portion followed by a body part and a bottom part,
   placing the first container in a mold with 0.2-10 cm of interspace between an inner wall of the mold and an outer wall of the first container for introduction of a foamable material,
   introducing and foaming the foamable material to form the foamed material layer, removing the mold,
   applying a removable, second layer on the outer surface of the foamed material layer for holding the foamed material layer and the first container together, resulting in the multi-layered pressure packaging.

8. A method for manufacturing a multi-layered pressure packaging that comprises a first container comprising a lockable neck portion followed by a body part and a bottom part, obtained from a non-foamed thermoplastic material by stretch blow molding of at least the body part, and a first layer at least enclosing the body part and/or bottom part of the first container,
   wherein the first layer comprises a foamed material layer;
   wherein the foamed material layer is foamed in place using an outer enclosure applied over and around the first container therebetween defining a free space, and foamable material was inserted in said free space between the first container and the outer enclosure and foamed thereby obtaining said foamed material layer, and
   wherein a removable, second layer is applied on the outer surface of the foamed material layer for holding the foamed material layer and the first container together,
   the method comprising the steps:
   stretch blow molding a first container that is lockable, the first container comprising a recloseable neck portion followed by a body part and a bottom part, out of a thermoplastic material without use of a foaming agent,
   foaming at least two container-forming parts out of a foamable material,
   forming a second container by applying the two foamed container-forming parts around the first container, thereby forming a first outer layer around at least the body part and/or the bottom part of the first container,
   holding said first and second container together by means of the application of a removable, second layer on the outer surface of the foamed material layer.

9. The method for manufacturing a multi-layered pressure packaging according to claim 1,
   the method comprising the steps:

stretch blow molding a first container that is lockable, the first container comprising a recloseable neck portion followed by a body part and a bottom part, out of a thermoplastic material without use of a foaming agent, stretch blow molding a second container that is lockable out of a thermoplastic material without use of a foaming agent, appropriate for enclosing the first container and forming an interspace between the first container and the second container, telescopically inserting the first container into the second container, thereby forming an interspace of 0.2-10 cm between an outer wall of the first container and an inner wall of the second container, applying a foamable material in the interspace, foaming the foamable material to form the foamed material layer, thereby filling up the interspace between the first container and second container.

10. The method according to claim 7, wherein a polymer layer is applied to the inside of the first container;

the polymer layer is different from the thermoplastic material selected for the first container and is characterized by an improved chemical resistance to the packaging content compared to said thermoplastic material.

11. The method according to claim 7, wherein the composition for forming said foamable material layer was tuned to the desired strength properties for the composite multi-layered pressure packaging.

12. A method for manufacturing a multi-layered pressure packaging that comprises a first container comprising a lockable neck portion followed by a body part and a bottom part, obtained from a non-foamed thermoplastic material by stretch blow molding of at least the body part, and a first layer at least enclosing the body part and/or bottom part of the first container, wherein the first layer comprises foamed material layer;

wherein the foamed material layer is foamed in place using an outer enclosure applied over and around the first container therebetween defining a free space, and foamable material was inserted in said free space between the first container and the outer enclosure and foamed thereby obtaining said foamed material layer, and wherein a removable, second layer is applied on the outer surface of the foamed material layer for holding the foamed material layer and the first container together, the method comprising the steps:

stretch blow molding a first container that is lockable, the first container comprising a recloseable neck portion followed by a body part and a bottom part, out of a thermoplastic material without use of a foaming agent, stretch blow molding a second container that is lockable out of a thermoplastic material without use of a foaming agent, appropriate for enclosing the first container and forming an interspace between the first container and the second container, telescopically inserting the first container into the second container, thereby forming an interspace of 0.2-10 cm between an outer wall of the first container and an inner wall of the second container, applying a foamable material in the interspace, and foaming the foamable material to form the foamed material layer, thereby filling up the interspace between the first container and second container, wherein the foamed material layer is non-adhesive to the non-foamed polyester material of the first container.

13. A method for manufacturing a multi-layered pressure packaging with sandwich structure the multi-layered pressure packaging comprising a first container comprising a lockable neck portion followed by a body part and a bottom part, obtained from a non-foamed thermoplastic material by stretch blow molding of at least the body part, and a first layer at least enclosing the body part and/or bottom part of the first container, wherein the first layer comprises foamed material layer;

wherein the foamed material layer is foamed in place using an outer enclosure applied over and around the first container therebetween defining a free space, and foamable material was inserted in said free space between the first container and the outer enclosure and foamed thereby obtaining said foamed material layer, and wherein a removable, second layer is applied on the outer surface of the foamed material layer for holding the foamed material layer and the first container together, the method comprising the steps:

stretch blow molding a first container that is lockable, the first container comprising a recloseable neck portion followed by a body part and a bottom part, out of a thermoplastic material without use of a foaming agent, stretch blow molding a second container that is lockable out of a thermoplastic material without use of a foaming agent, appropriate for enclosing the first container and forming an interspace between the containers, removing the bottom part of said first container and second container, injection-molding a separate bottom piece, fiber-reinforced, combining the first container and second container with the bottom piece for forming an interspace of 0.2-10 cm between an outer wall of the first container and an inner wall of the second container, applying a foamable material in the interspace, foaming the foamable material in the interspace to form the foamed material layer, thereby forming the multi-layered pressure packaging with sandwich structure.

14. A product obtained by a method according to claim 13, wherein that the length of the first container and second container are essentially the same and said body part is enclosed by a hard foam;

wherein a valve is included in the separate bottom piece for bringing filling material under pressure.

* * * * *